United States Patent
Cho et al.

(10) Patent No.: US 8,281,107 B2
(45) Date of Patent: Oct. 2, 2012

(54) METHOD OF SHARING COARSE GRAINED ARRAY AND PROCESSOR USING THE METHOD

(75) Inventors: Yeon Gon Cho, Hwaseong-si (KR); Suk Jin Kim, Seoul (KR); Sang Suk Lee, Busan (KR); Junhee Kim, Yongin-si (KR); Jeongwook Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 572 days.

(21) Appl. No.: 12/032,709

(22) Filed: Feb. 18, 2008

(65) Prior Publication Data

US 2009/0055626 A1    Feb. 26, 2009

(30) Foreign Application Priority Data

Aug. 24, 2007   (KR) .................. 10-2007-0085613

(51) Int. Cl.
*G06F 15/00* (2006.01)

(52) U.S. Cl. ......................................... 712/10
(58) Field of Classification Search .............. None
See application file for complete search history.

(56) References Cited

U.S. PATENT DOCUMENTS

| | | | |
|---|---|---|---|
| 6,725,354 B1 * | 4/2004 | Kahle et al. ............... | 712/34 |
| 7,299,339 B2 * | 11/2007 | Ramesh ................... | 712/24 |
| 2007/0150711 A1 * | 6/2007 | Kim et al. ................ | 712/228 |

* cited by examiner

*Primary Examiner* — Eddie P Chan
*Assistant Examiner* — John Lindlof
(74) *Attorney, Agent, or Firm* — NSIP Law

(57) ABSTRACT

A method of sharing a coarse grained array and a processor using the method is provided. A processor includes a first processor core including a plurality of first functional units which execute a first instruction set, a second processor core including a plurality of second functional units which execute a second instruction set, and a coarse grained array including a plurality of third functional units which execute a portion of instructions of the first instruction set and/or the second instruction set, instead of the first processor core and/or the second processor core.

25 Claims, 13 Drawing Sheets

METHOD OF SHARING COARSE GRAINED ARRAY AND PROCESSOR USING THE METHOD

CROSS-REFERENCE TO RELATED APPLICATION

This application claims the benefit under 35 U.S.C. §119 (a) of a Korean Patent Application No. 10-2007-0085613, filed on Aug. 24, 2007, in the Korean Intellectual Property Office, the entire disclosure of which is incorporated herein by reference.

TECHNICAL FIELD

The following description relates to a reconfigurable processor (RP) core architecture. More particularly, the following description relates to a multi-core processor using a coarse grained array.

BACKGROUND

Conventionally, a device executing an operation is embodied using hardware or software. As an example, when a network controller functioning as a network interface is embedded on a computer chip, the network controller only executes a defined network interface function, which is defined when the network controller is fabricated at a factory. In the case of a device using hardware, it is impossible to alter the network controller function after the network controller is fabricated. In the case of a device using software, a program is programmed by a programmer, and the program is executed in a general purpose processor, thereby satisfying a requirement of the user. In the case of the device using software, it is possible to add a new function by altering software after the original hardware is fabricated from the factory. In the case of the device using software, it is possible to perform various functions using a given hardware, however speed is reduced when compared with the device using hardware.

Accordingly, RP core architecture is provided. The RP core architecture may be customized to solve certain problems after device fabrication, and also may adopt a spatially customized calculation to execute calculation.

The architecture of the reconfigurable processor may be embodied using a very long instruction word (VLIW) processor being capable of processing a plurality of instructions in parallel and a coarse grained array (CGA).

Accordingly, a new method and processor is provided, which may configure a multi-core reconfigurable processor since the VLIW processor and the CGA are effectively used requiring little additional area for hardware, improving parallelism where executing instructions is possible.

SUMMARY

In one general aspect, there is provided a processor which has adopted an architecture of a reconfigurable processor.

In another general aspect, there is provided a method and processor using the method which configures a multi-core reconfigurable processor since a very long instruction word (VLIW) processor and a coarse grained array (CGA) are effectively used requiring little additional area for hardware.

In still another general aspect, there is provided a method and processor using the method which improves parallelism between processor cores of an architecture of a multi-core processor.

In yet another general aspect, a processor comprises: a first processor core including a plurality of first functional units which execute a first instruction set; a second processor core including a plurality of second functional units which execute a second instruction set; and a coarse grained array including a plurality of third functional units which execute a portion of instructions of the first instruction set and/or the second instruction set, instead of the first processor core and/or the second processor core.

In still another general aspect, a method of sharing a coarse grained array comprises: generating a first determination signal by determining whether a first instruction set to be executed in the first processor core satisfies a determinant condition; generating a second determination signal by determining whether a second instruction set to be executed in a second processor core satisfies the determinant condition; transmitting a portion of instructions of the first instruction set and/or the second instruction set to the coarse grained array, based on the first determination signal and the second determination signal.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

An architecture of a reconfigurable processor (RP) includes a single processor and arrays of a plurality of functional units. As an example, the arrays of the plurality of functional units are referred to as coarse grained arrays (CGA).

A processor which is used for the architecture of the reconfigurable processor may be a very long instruction word (VLIW) processor.

The VLIW processor includes a plurality of functional units to simultaneously execute a plurality of instructions, and distributes each of inputted plurality of instructions to each of the plurality of functional units to execute the distributed plurality of instructions in parallel. With this parallel instruction execution, the total instruction execution time may be reduced.

A number of instructions that can be simultaneously executed in a single VLIW processor is determined by a number of the plurality of functional units, included in the single VLWI processor.

A processor according to an exemplary embodiment uses architecture of a reconfigurable processor which includes a plurality of processor cores.

As speed of advancements of manufacturing techniques of a processor decreases, advancements in performance speed of a single processor core also decreases. As performance of the single processor core reaches its theoretical limitations, there becomes a probability that required performance may not be possible by exclusively using the single processor core.

When improved performance of a processor is required, an architecture of a multi-core processor using a plurality of processor cores is used.

The exemplary processor may configure a multi-core RP since a VLIW processor and a CGA are effectively used requiring little additional area for hardware, thereby optimizing performance.

Figure 1:
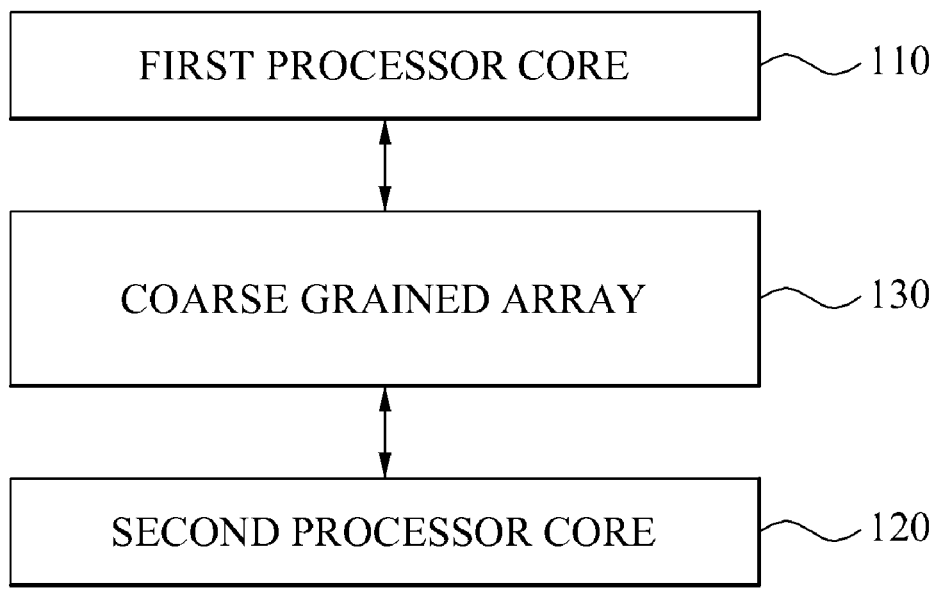
FIG. 1 is a block diagram illustrating an exemplary processor.

FIG. 1 illustrates an exemplary processor 100.

Referring to FIG. 1, the processor 100 includes a first processor core 110, a second processor core 120, and a coarse grained array 130.

The first processor core 110 includes a plurality of first functional units which execute a first instruction set.

The second processor core 120 includes a plurality of second functional units which execute a second instruction set.

The coarse grained array 130 includes a plurality of third functional units which execute a portion of instructions of the first instruction set and/or the second instruction set, instead of the first processor core 110 and/or the second processor core 120.

The plurality of third functional units of the coarse grained array 130 may execute the portion of instructions of the first instruction set instead of the first processor core 110.

The plurality of third functional units of the coarse grained array 130 may execute the portion of instructions of the second instruction set instead of the second processor core 120.

The plurality of third functional units of the coarse grained array 130 may reduce an entire execution time of the processor 100 by executing the portion of instructions of the first instruction set and/or the second instruction set, instead of the first processor core 110 and/or the second processor core 120.

The plurality of third functional units of the coarse grained array 130 may substitute for the first processor core 110, and substitute for the second processor core 120. From another viewpoint, it is assumed that the single coarse grained array 130 is shared by both the first processor core 110 and the second processor core 120.

Since the first processor core 110 and the second processor core 120 share the coarse grained array 130, parallelism of execution of instructions of the processor 100 may be improved, and an execution time for the entire instruction set may be reduced.

In a complete program consisting of instructions, a control intensive portion, that is a portion where branches or conditional sentences are concentrated, is executed by the first processor core 110 or the second processor core 120, and a data intensive portion is executed by the coarse grained array 130, thereby reducing an entire execution time.

As an example, in a data crunching application, it is assumed that a ratio of a control intensive portion to a loop portion is 2:8 from a total program code execution time. In the case of a general processor, a number of instructions executed by a single coarse grained array is greater than a number of instructions executed by a single processor core. However, according to the processor 100 of the present invention, when a loop portion is accelerated using assistance of a compiler or a hardware, a number of instructions executed by the first processor core 110 and the second processor core 120 is greater than a number of instructions executed by the coarse grained array 130.

A configuration that the first processor core 110 and the second processor core 120 share the coarse grained array 130 is possible to improve execution speed in the case more instructions are executed in the first processor core 110 and the second processor core 120.

Since the first processor core 110 and the second processor core 120 may share the coarse grained array 130, an area occupied by a circuit can be reduced in comparison to a configuration that each of the first processor core 110 and the second processor core 120 separately have a coarse grained array.

According to an exemplary embodiment, a configuration that the first processor core 110 and the second processor core 120 time-share the coarse grained array 130, is possible.

Figure 2:
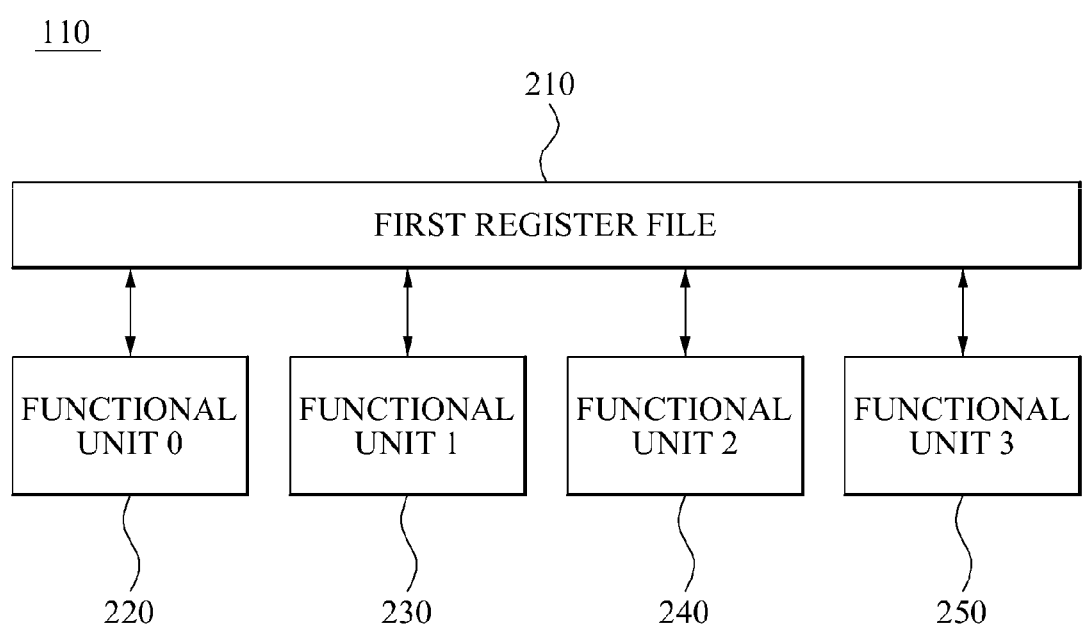
FIG. 2 is a block diagram illustrating an exemplary first processor core of FIG. 1.

FIG. 2 illustrates the first processor core 110 of FIG. 1.

Referring to FIG. 2, the first processor core 110 includes a first register file 210 and a plurality of functional units, FUNCTIONAL UNIT 0 (220), FUNCTIONAL UNIT 1 (230), FUNCTIONAL UNIT 2 (240), FUNCTIONAL UNIT 3 (250).

The plurality of functional units 220, 230, 240, and 250 configure first functional units.

The first register file 210 stores execution results of the plurality of first functional units 220, 230, 240, and 250.

The plurality of functional units 220, 230, 240, and 250 configuring the first functional units execute instructions which are included in a first instruction set to be executed in the first processor core 110.

According to an exemplary embodiment, the first processor core 110 may be a VLIW processor core. In this instance, an operation of assigning each instruction included in the first instruction set to each of the plurality of functional units 220, 230, 240, and 250 may follow an operation of assigning instructions in a general VLIW processor core.

According to an exemplary embodiment, the first register file 210 may further store a final execution result of a portion of the instructions of the first instruction set to be executed in the coarse grained array 130 of FIG. 1.

A configuration of the second processor core 120 of FIG. 1 is omitted in drawings of the present specification since the configuration of the second processor core 120 is similar to the configuration of the first processor core 110.

The second processor core 120 may include a second register file and a plurality of second functional units. The second register file stores execution results of the plurality of second functional units.

According an exemplary embodiment, the second processor core 120 may be a VLIW processor core. In this instance, an operation of assigning each of instructions included in the second instruction set to each of the plurality of second functional units included in the second processor core 120 may follow an operation of assigning instructions in a general VLIW processor core.

According to an exemplary embodiment, the second register file may store a final execution result of a portion of instructions of the second instruction set to be executed in the coarse grained array 130.

Figure 3:
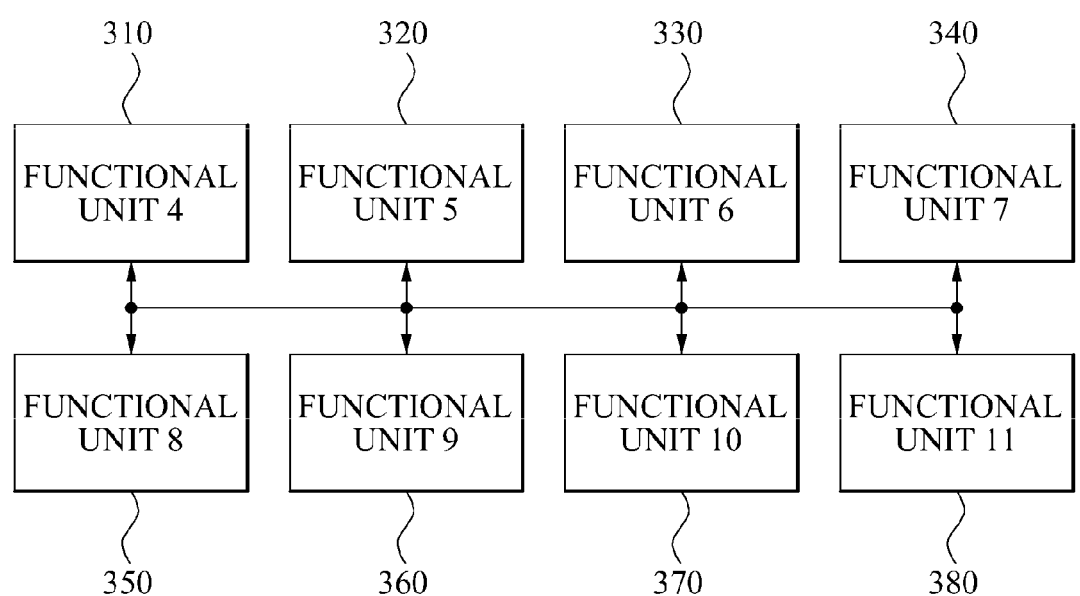
FIG. 3 is a diagram illustrating an exemplary coarse grained array of FIG. 1.

FIG. 3 illustrates the coarse grained array 130 of FIG. 1.

Referring to FIG. 3, the coarse grained array 130 includes a plurality of third functional units 310, 310, 330, 340, 350, 360, 370, and 380.

As illustrated in FIG. 3, the plurality of third functional units 310, 310, 330, 340, 350, 360, 370 and 380 of the coarse grained array 130 are connected with each other via a data path.

Via the data path, execution results of the functional units 4 (310), the functional unit 5 (320), the functional unit 6 (330), and the functional unit 7 (340) may be transmitted to the functional unit 8 (350), the functional unit 9 (360), the functional unit 10 (370), and the functional unit 11 (380).

According to an exemplary embodiment, configuration information about connections between the plurality of third functional units 310, 320, 330, 340, 350, 360, 370 and 380 of the coarse grained array 130 may be stored in a configuration memory outside of the coarse grained array 130.

According to an exemplary embodiment, the coarse grained array 130 may further include a first-in first-out (FIFO) memory. The FIFO memory in the coarse grained array 130 synchronizes data between the first processor core 110 of FIG. 1 and the second processor core 120 of FIG. 1.

According to an exemplary embodiment, to synchronize data between the first processor core 110 and the second processor core 120, the FIFO memory may delay data transmitted from the first processor core 110 for a first delay time to transmit delayed data to the second processor core 120, and delay data transmitted from the second processor core 120 for a second delay time to transmit delayed data to the first processor core 110.

Once the data is synchronized between the first processor core 110 and the second processor core 120 by the FIFO memory, the processor 100 of FIG. 1 may achieve thread-level parallelism.

Figure 4:
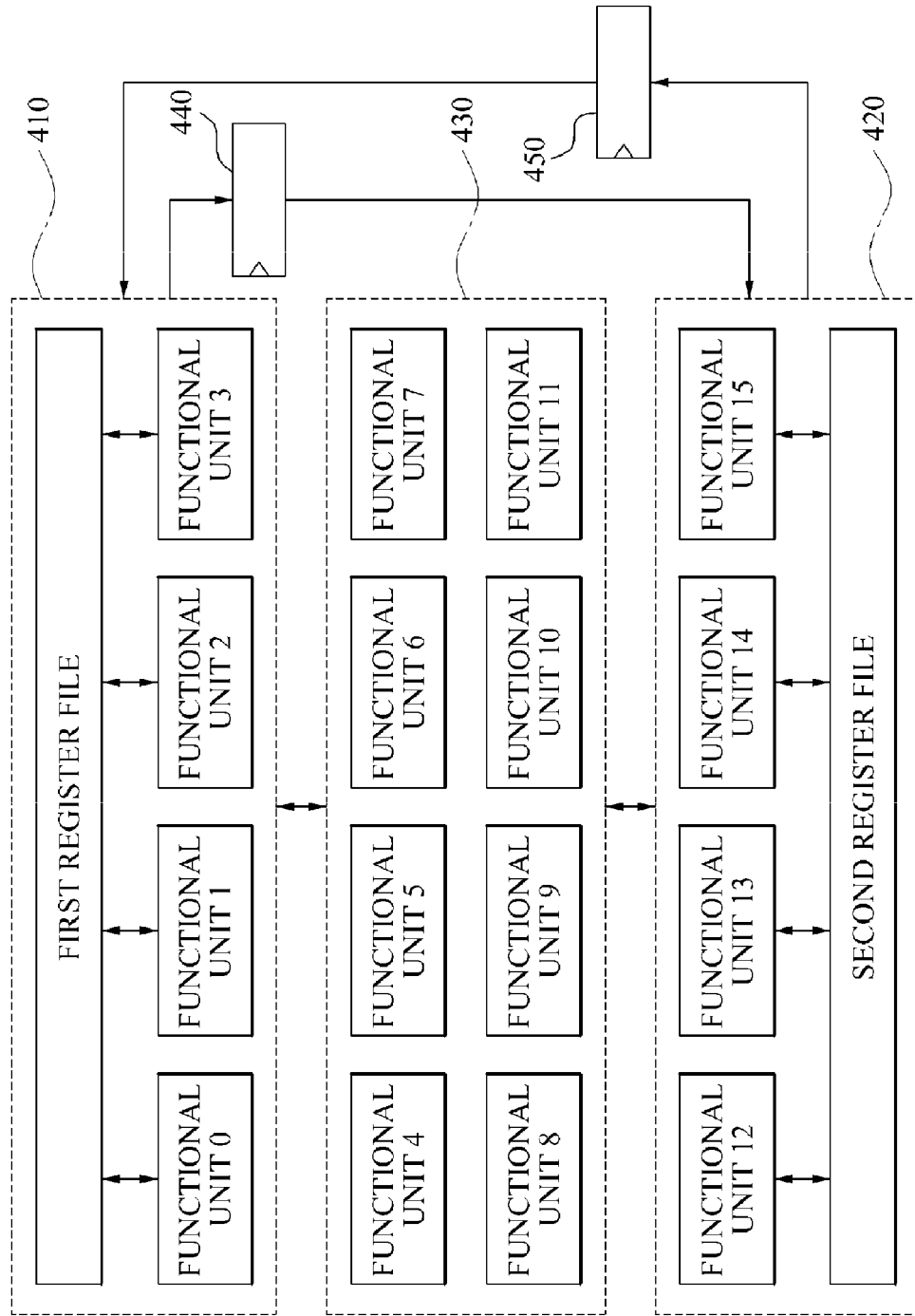
FIG. 4 is a diagram illustrating another exemplary processor.

FIG. 4 illustrates another exemplary processor 400.

Referring to FIG. 4, the processor 400 includes a first processor core 410, a second processor core 420, a coarse grained array 430, a first inter-core register 440, and a second inter-core register 450.

The first processor core 410 includes a first register file and a plurality of first functional units. The plurality of first functional units consist of functional units 0, 1, 2, and 3, and each of the plurality of first functional units is connected with the first register file. Result values of instructions executed by each of the plurality of first functional units are transmitted to the first register file, and stored in the first register file.

The second processor core 420 includes a second register file and a plurality of second functional units. The plurality of second functional units consist of functional units 12, 13, 14, and 15, and each of the plurality of second functional units is connected with the second register file. Result values of instructions executed by each of the plurality of second functional units are transmitted to the second register file, and stored in the second register file.

It is assumed that a first instruction set to be executed in the first processor core 410 consists of instructions 0000 through 0011, and instructions 0100 through 0111 are executed in the coarse grained array 430.

An instruction 0000 is executed in a functional unit 0, an instruction 0001 is executed in a functional unit 1, an instruction 0010 is executed in a functional unit 2, and an instruction 0011 is executed in a functional unit 3.

Since instructions 0100 through 0111 are required to be subsequently executed in the coarse grained array 430 after instructions 0000 through 0011 are executed, execution results of instructions 000 through 0011 are not transmitted to the first register file, but is transmitted to the coarse grained array 430. That is, a functional unit 0 does not transmit an execution result of an instruction 0000 to the first register file, but transmits the execution result of the instruction 0000 to the coarse grained array 430. Each of the functional units 1, 2, and 3 does not transmit execution results of instructions 0001 through 0011 to the first register file, but transmits the execution results of instructions 0001 through 0011 to the coarse grained array 430.

Result values of instructions 0100 through 0111 executed in the coarse grained array 430 are transmitted to the first register file of the first processor core 410, and stored in the first register file. The result values of instructions 0100 through 0111 stored in the first register file are used for an execution operation of the first processor core 410 with respect to instructions 1000 through 1111.

The first inter-core register 440 temporarily stores data transmitted from the first processor core 410, and transmits temporarily stored data to the second processor core 420.

The second inter-core register 450 temporarily stores data transmitted from the second processor core 420, and transmits temporarily stored data to the first processor core 410.

Result values of instructions executed in the first processor core 410 may be used for an execution of instructions of the second processor core 420. Conversely, result values of instructions executed in the second processor 420 may be used for an execution of instructions of the first processor core 410. The first inter-core register 440 and the second inter-core register 450 transmit data between the first processor core 410 and the second processor core 420.

Figure 5:
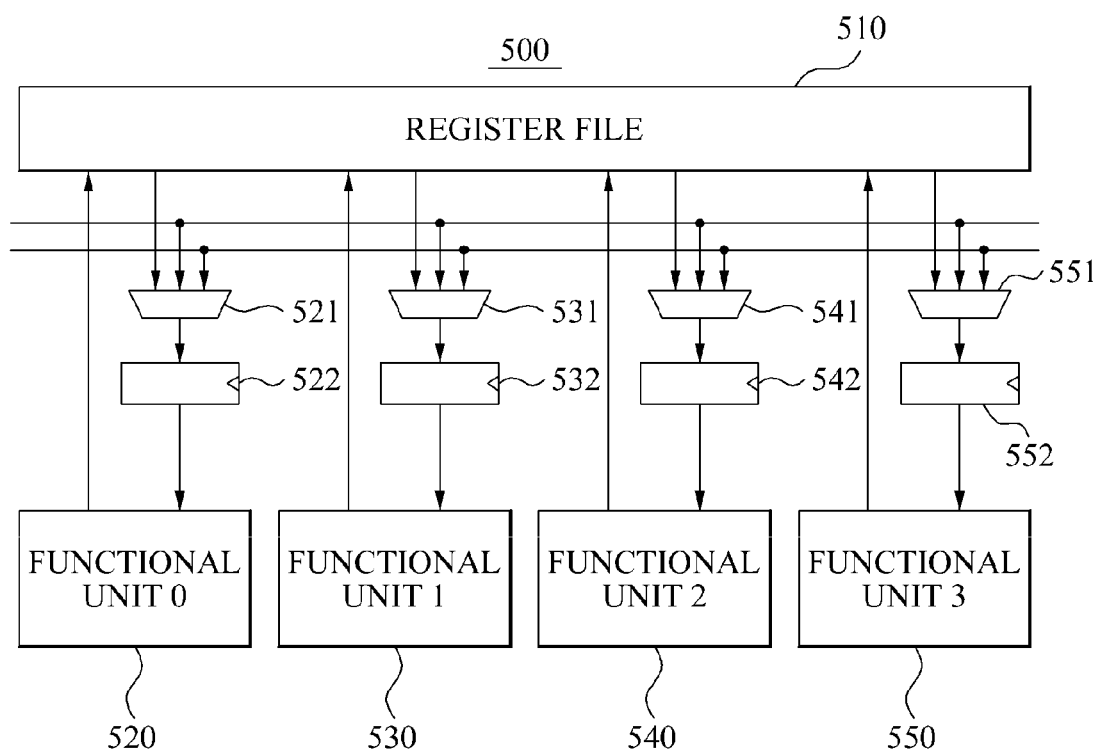
FIG. 5 is a diagram illustrating an exemplary first processor core included in a processor according to another exemplary embodiment.

FIG. 5 illustrates a first processor core 500 included in a processor according to another exemplary embodiment.

Referring to FIG. 5, the first processor core 500 includes a register file 510, a functional unit 0 (520), a functional unit 1 (530), a functional unit 2 (540), and a functional unit 3 (550).

The register file 510 stores result values of instructions executed in the functional units 0 (520), 1 (530), 2 (540), and 3 (550).

The first processor core 500 includes multiplexers 521, 531, 541, and 551 and registers 522, 532, 542, and 552.

The multiplexer 521 selects data stored in the register file 510 and any one of data transmitted from a second processor core or a coarse grained array, and transmits selected data to the register 522.

The register 522 temporarily stores transmitted data, and transmits stored data to the functional unit 0 (520).

The multiplexer 531 selects data stored in the register file 510 and any one of data transmitted from the second processor core or the coarse grained array, and transmits selected data to the register 532.

The register 532 temporarily stores transmitted data, and transmits stored data to the functional unit 1 (530).

Figure 6:
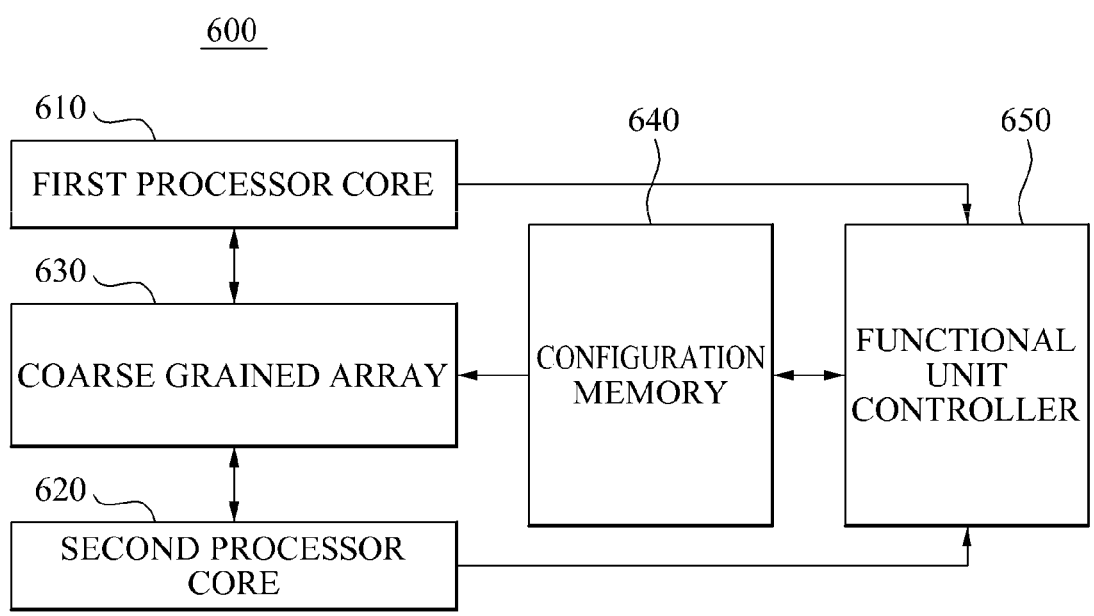
FIG. 6 is a diagram illustrating still another exemplary processor.

FIG. 6 illustrates still another exemplary processor 600.

Referring to FIG. 6, the processor 600 includes a first processor core 610, a second processor core 620, a coarse grained array 630, a configuration memory 640, and a functional unit controller 650.

The first processor core 610 includes a plurality of first functional units executing a first instruction set. The second processor core 620 includes a plurality of second functional units executing a second instruction set.

The coarse grained array 630 executes a portion of instructions of the first instruction set and/or the second instruction set, instead of the first processor core 610 and/or the second processor core 620.

The coarse grained array 630 includes a plurality of third functional units to execute instructions.

The configuration memory 640 stores configuration information about connections between the plurality of third functional units of the coarse grained array 630.

The configuration memory 640 stores optimized configuration information, from instructions of the first instruction set and/or the second instruction set, for enabling the plurality of third functional units to execute the portion of instructions of the first instruction set and/or the second instruction set.

The functional unit controller 650 assigns the portion of instructions of the first instruction set and/or the second instruction set to the plurality of third functional units of the coarse grained array 630.

The functional unit controller 650 determines assignment to the third functional units of the coarse grained array 630 based on usage information of the first functional units of the first processor core 610 and/or the second functional units of the second processor core 620.

The functional unit controller 650 receives usage information of the plurality of first functional units from the first processor core 610.

The functional unit controller 650 receives usage information of the plurality of second functional units from the second processor core 620.

The functional unit controller 650 determines assignment to the third functional units of the coarse grained array 630 by referring to configuration information of the coarse grained array 630 being stored in the configuration memory 640.

According to an exemplary embodiment, the processor 600 may further includes a temporary memory (not shown) storing results of instructions executed by the coarse grained array 630.

Figure 7:
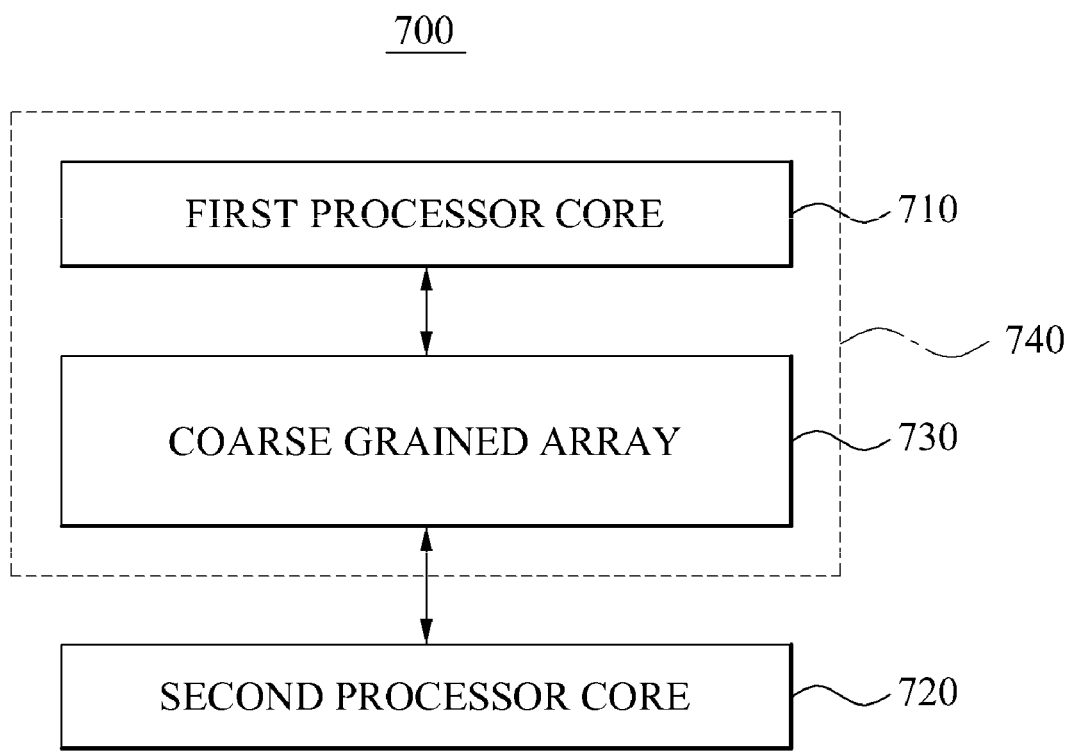
FIG. 7 is a diagram illustrating yet another exemplary processor.

FIG. 7 illustrates yet another exemplary processor 700.

Referring to FIG. 7, the processor 700 includes a first processor core 710, a second processor core 720, and a coarse grained array 730. Operations of the first processor core 710, the second processor core 720, and the coarse grained array 730 are as same as the operations described with reference to FIG. 1.

Regarding an operation state illustrated in FIG. 7, it is illustrated the coarse grained array 730 executes a portion of instructions of a first instruction set to be executed in the first processor core 710, instead of the first processor core 710.

Inside a processing block 740, it is illustrated the first processor core 710 and the coarse grained array 730 execute instructions of a first instruction set by mutually interoperating with each other.

Figure 8:
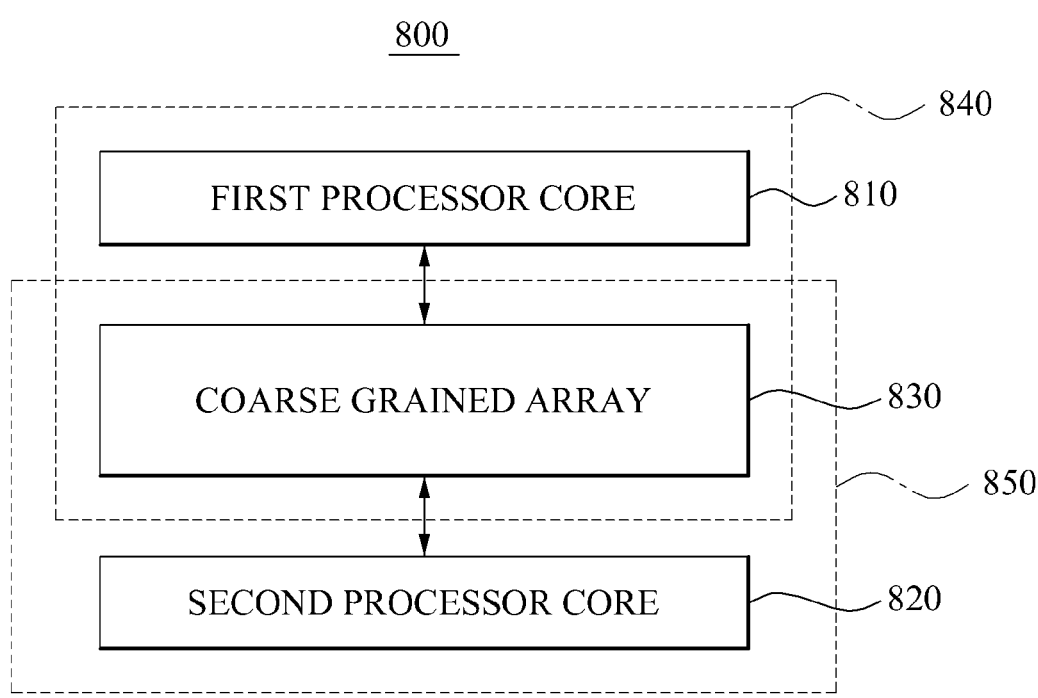
FIG. 8 is a diagram illustrating exemplary operations of sharing a coarse grained array of a processor.

FIG. 8 illustrates exemplary operations of sharing a coarse grained array of a processor 800.

Referring to FIG. 8, the processor 800 includes a first processor core 810, a second processor core 820, and a coarse grained array 830. Operations of the first processor core 810, the second processor core 820, and the coarse grained array 830 are as same as the operations described with reference to FIG. 1.

Inside a processing block 840, it is illustrated the first processor core 810 and the coarse grained array 830 execute instructions of a first instruction set by mutually interoperating with each other for a first time period.

Inside a processing block 850, the second processor core 820 and the coarse grained array 830 execute instructions of a second instruction set by mutually interoperating with each other for a second time period.

According to an exemplary embodiment, each of the first processor core 810 and the second processor core 820 may be a uni-clustered VLIW processor core. When each of the first processor core 810 and the second processor core 820 respectively includes an N number of functional units, the processor 800 may operate as a reconfigurable processor with a dual N-issue VLIW processor core.

According to an exemplary embodiment, the first processor core 810 and the second processor core 820 may execute instructions as a single cluster. Where each of the first processor core 810 and the second processor core 820 respectively includes an N number of functional units, the processor 800 may operate as a reconfigurable processor with a 2N-issue VLIW processor core.

In this instance, each of the first instruction set and the second instruction set may be a portion of a single instruction set. The processor 800 divides the single instruction set into a first instruction set and a second instruction set, and may assign the first instruction set to the first processor core 810 and assign the second instruction set to the second processor core 820.

Figure 9:
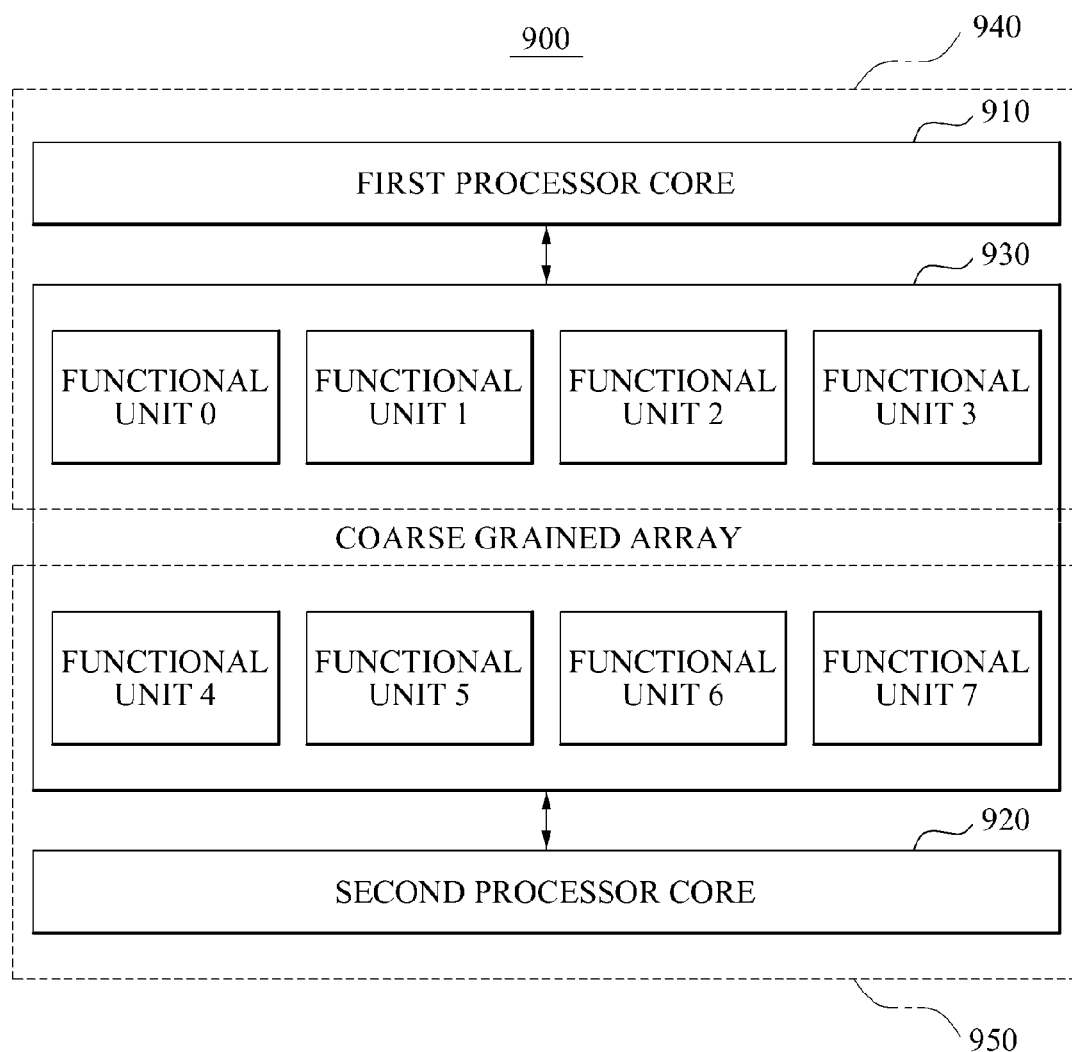
FIG. 9 is a diagram illustrating another exemplary operations of sharing a coarse grained array of a processor.

FIG. 9 illustrates another example of operations of sharing a coarse grained array of a processor 900.

Referring to FIG. 9, the processor 900 includes a first processor core 910, a second processor core 920, and a coarse grained array 930. Operations of the first processor core 910, the second processor core 920, and the coarse grained array 930 are as same as the operations described with reference to FIG. 1.

Inside a processing block 940, it is illustrated a functional unit 0, a functional unit 1, a functional unit 2, and a functional unit 3 of the coarse grained array 930 are assigned to exclusively execute instructions of a first instruction set.

Inside the processing block 940, it is illustrated the first processor core 910 and the functional units 0, 1, 2, and 3 of the coarse grained array 930 execute instruction of the first instruction set by mutually interoperating with each other.

Inside a processing block 950, it is illustrated functional units 4, 5, 6, and 7 of the coarse grained array 930 are assigned to exclusively execute instructions of a second instruction set.

Inside the processing block 950, it is illustrated the second processor core 920 and the functional units 4, 5, 6, and 7 of the coarse grained array 930 execute instructions of the second instruction set by mutually interoperating with each other.

The first instruction set and the second instruction set are executed in the coarse grained array 930 during a same time period. In this instance, the functional units 0, 1, 2, and 3 of the coarse grained array 930 are assigned to exclusively execute the first instruction set. The functional units 4, 5, 6, and 7 of the coarse grained array 930 are assigned to exclusively execute the second instruction set.

Figure 10:
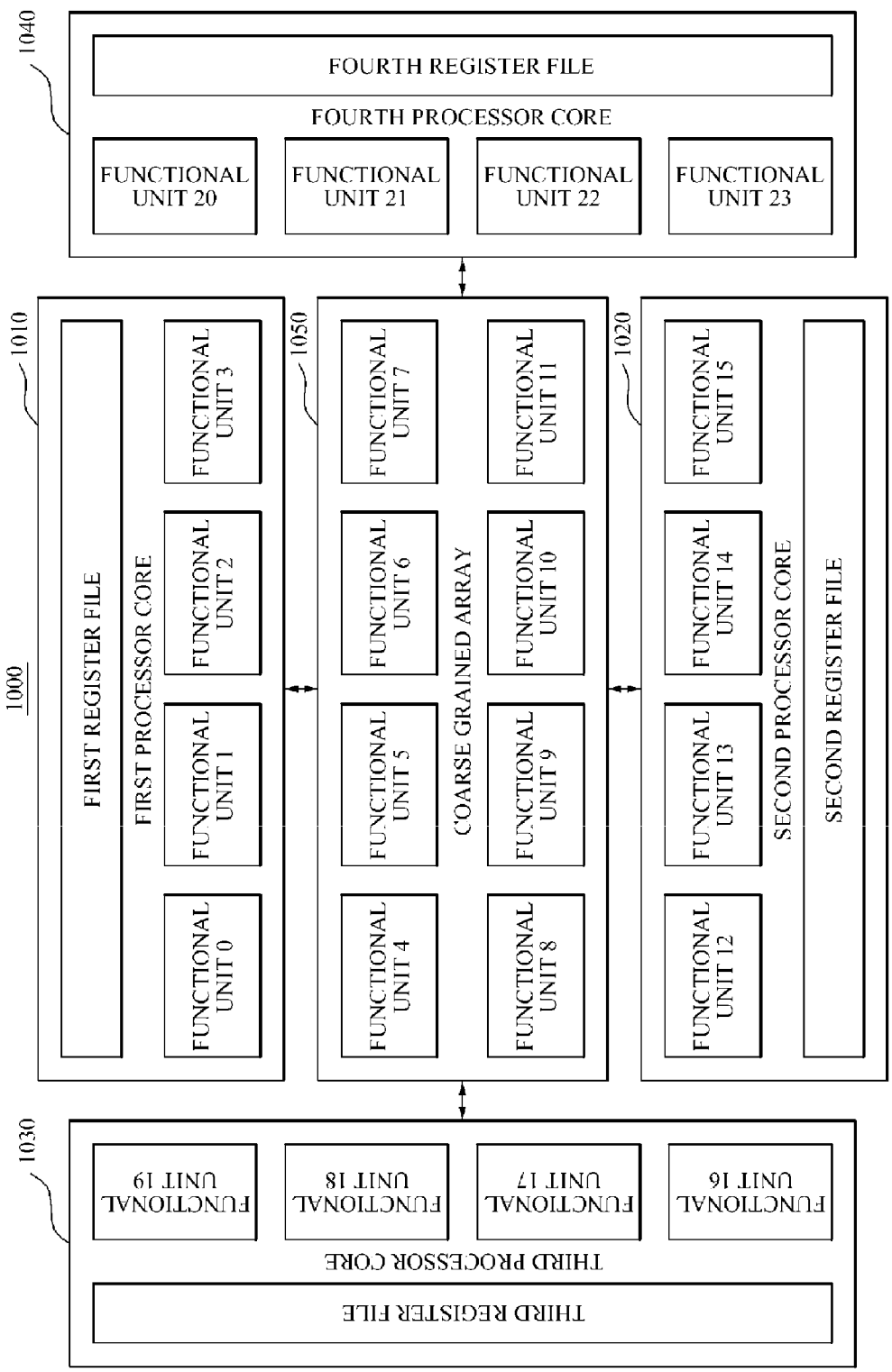
FIG. 10 is a diagram illustrating another exemplary processor.

FIG. 10 illustrates another exemplary processor 1000.

Referring to FIG. 10, the processor 1000 includes a first processor core 1010, a second processor core 1020, a third processor core 1030, a fourth processor core 1040, and a coarse grained array 1050.

The first processor core 1010 includes functional units 0, 1, 2, and 3 and a first register file. The functional units 0, 1, 2, and 3 execute a first instruction set. The first register file stores result values of instructions executed by the functional units 0, 1, 2, and 3.

The second processor core 1020 includes a second register file and functional units 12, 13, 14, and 15. The functional units 12, 13, 14, and 15 execute a second instruction set. The second register filer stores result values of instructions executed by the functional units 12, 13, 14, and 15.

The third processor core 1030 includes a third register file and functional units 16, 17, 18, and 19. The functional units 16, 17, 18, and 19 execute a third instruction set. The third register filer stores result values of instructions executed by the functional units 16, 17, 18, and 19.

The fourth processor core 1040 includes a fourth register file and functional units 20, 21, 22, and 23. The functional units 20, 21, 22, and 23 execute a fourth instruction set. The fourth register filer stores result values of instructions executed by the functional units 20, 21, 22, and 23.

The coarse grained array 1050 includes functional units 4, 5, 6, 7, 8, 9, 10, and 11. The coarse grained array 1050 may execute a portion of instructions of a first instruction set instead of the first processor core 1010. The coarse grained array 1050 may execute a portion of instructions of a second instruction set and a third instruction set instead of the second processor core 1020 and/or the third processor core 1030. The coarse grained array 1050 may execute a portion of instructions of a fourth instructions set instead of the fourth processor core 1040.

The coarse grained array 1050 may execute a portion of instructions of the first instruction set and/or the fourth instruction set instead of the first processor core 1010 and/or the fourth processor core 1040 during a same time period.

According to an exemplary embodiment, the first processor core 1010 and the second processor core 1020 may execute instructions by forming a single cluster. In this instance, the first processor core 1010 and the second processor core 1020 may operate as a single 8-issue VLIW processor core.

According to an exemplary embodiment, each of the third processor core 1030 and the fourth processor core 1040 may operate as a single uni-clustered processor core.

Figure 11:
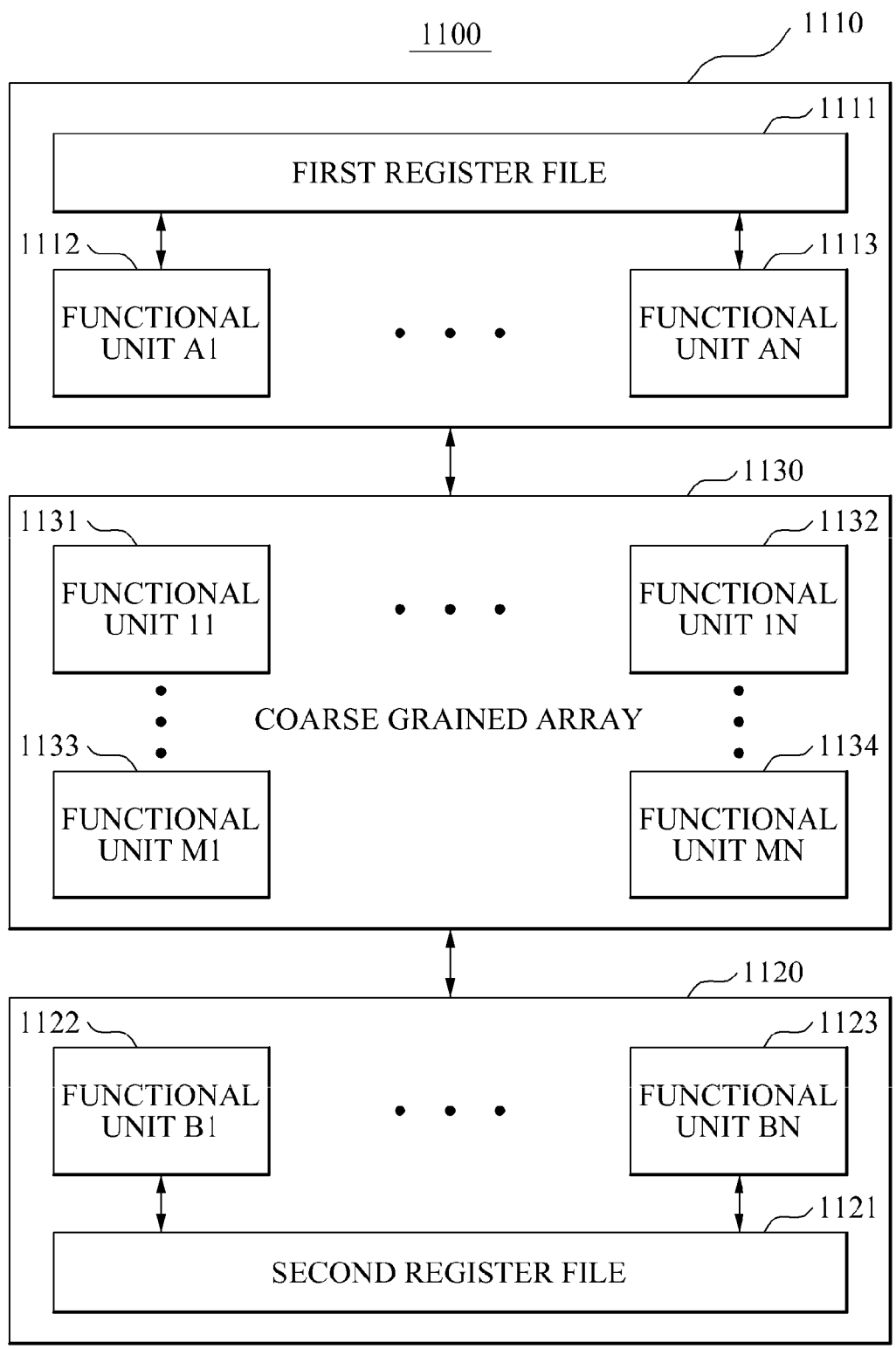
FIG. 11 is a diagram illustrating still another exemplary processor.

FIG. 11 illustrates still another exemplary processor 1100.

Referring to FIG. 11, the processor 1100 includes a first processor core 1110, a second processor core 1120, and a coarse grained array 1130.

The first processor core 1110 includes a first register file 1111 and functional units A1 (1112), A2 . . . , . . . , and AN (1113). The functional units A1 (1112), A2 . . . , . . . , and AN (1113) execute a first instruction set. The first register file 1111 stores result values of instructions executed by the functional units A1 (1112), A2 . . . , . . . , and AN (1113).

The second processor core 1120 includes a second register file 1121 and functional units B1 (1122), B2 . . . , . . . , and BN (1123). The functional units B1 (1122), B2 . . . , . . . , and BN (1123) execute a second instruction set. The second register file 1121 stores result values of instructions executed by the functional units B1 (1122), B2 . . . , . . . , and BN (1123).

The coarse grained array 1130 includes functional units of an M×N array. The coarse grained array 1130 may execute a portion of instructions of the first instruction set and the second instruction set instead of the first processor core 1110 and the second processor core 1120.

The functional units of the M×N array in the coarse grained array 1130 are configured as follows:

Functional units 11 (1131), 12 . . . , . . . , and 1N (1132) configure a first row in the M×N array.

Functional units 21, 22 . . . , . . . , and 2N (not shown) configure a second row in the M×N array.

Functional units M1 (1133), M2 . . . , . . . , and MN (1134) configure an Mth row in the M×N array.

Figure 12:
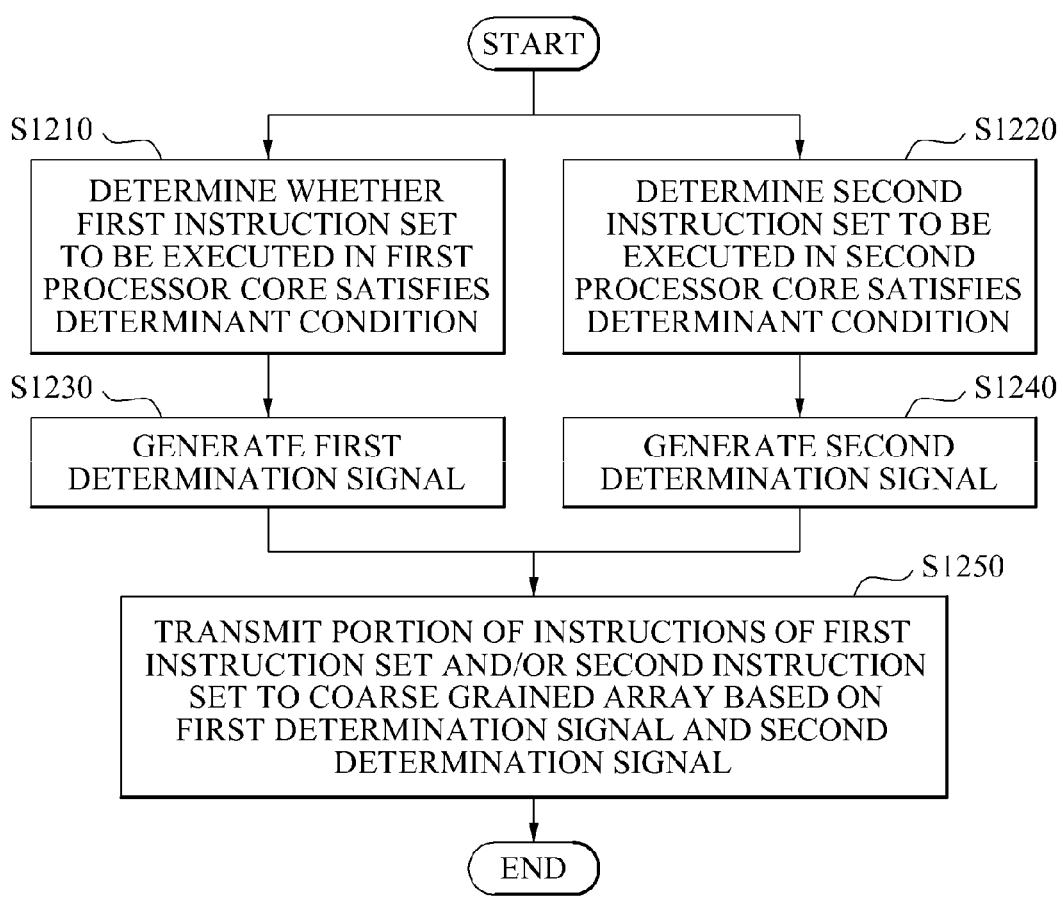
FIG. 12 is a flowchart illustrating exemplary operations of sharing a coarse grained array.

FIG. 12 illustrates exemplary operations of sharing a coarse grained array.

Referring to FIG. 12, a method of sharing a coarse grained array determines whether a first instruction set to be executed in a first processor core satisfies a determinant condition in operation S1210.

In operation S1230, the method of sharing the coarse grained array generates a first determination signal according to a determination result from the operation S1210.

The method of sharing the coarse grained array determines whether a second instruction set to be executed in a second processor core satisfies the determinant condition in operation S1220.

In operation S1240, the method of sharing the coarse grained array generates a second determination signal according to a determination result of the operation S1220.

The method of sharing the coarse grained array transmits a portion of instructions of the first instruction set and/or the second instruction set to the coarse grained array, based on the first determination signal and the second determination signal in operation S1250.

According to an exemplary embodiment, the method of sharing the coarse grained array may delay result data of the first instruction set transmitted from the first processor core for a first delay time to transmit delayed result data to the second processor core. Also, the method of sharing the coarse grained array may delay result data of the second instruction set transmitted from the second processor core for a second delay time to transmit delayed result data to the first processor core.

According to an exemplary embodiment, the method of sharing the coarse grained array may temporarily store execution results executed by the coarse grained array.

According to an exemplary embodiment, the method of sharing the coarse grained array may divide a single instruction set to generate the first instruction set and the second instruction set.

According to an exemplary embodiment, the method of sharing the coarse grained array may store a final execution result of the first instruction set executed in the coarse grained array in a first register file of the first processor core. Also, the method of sharing the coarse grained array may store a final execution result of the second instruction set to be executed in the coarse grained array in a second register file of the second processor core.

Figure 13:
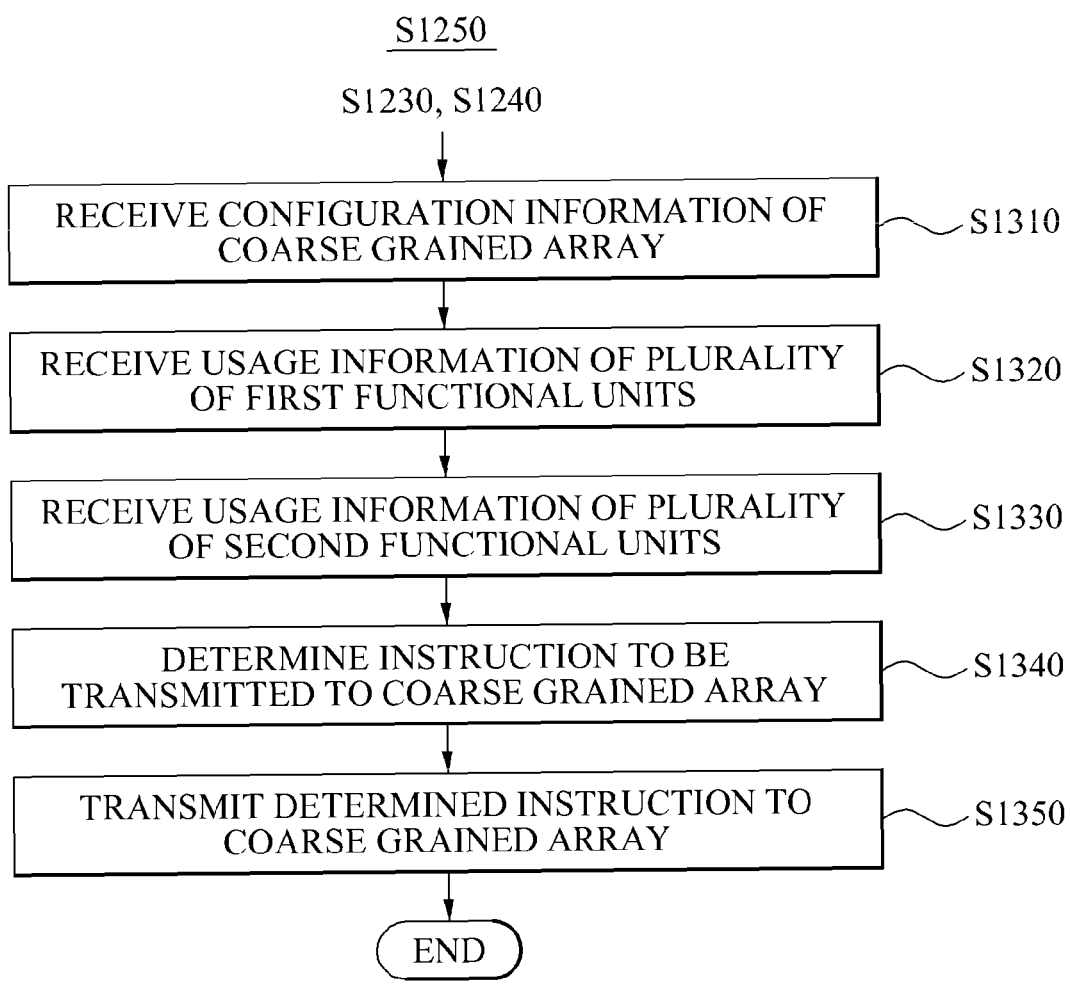
FIG. 13 is a flowchart illustrating an exemplary operation of transmitting a portion of instructions of FIG. 12.

FIG. 13 illustrates operation S1250 of FIG. 12 in detail.

Referring to FIG. 13, a method of sharing a coarse grained array receives configuration information of the coarse grained array from a configuration memory in operation S1310.

The method of sharing the coarse grained array receives usage information of first functional units in a first processor core from the first processor core in operation S1320.

The method of sharing the coarse grained array receives usage information of second functional units in a second processor core from the second processor core in operation S1330.

The method of sharing the coarse grained array determines an instruction to be transmitted to the coarse grained array in operation S1340.

Operation S1340 determines an instruction of the first instruction set and/or the second instruction set to transmit the determined instruction to the coarse grained array, based on the configuration information received from the configuration memory.

Operation S1340 determines the instruction of the first instruction set and/or the second instruction set to transmit the determined instruction to the coarse grained array, based on usage information of the first functional units and usage information of the second functional units.

The method of sharing the coarse grained array transmits the determined instruction to the coarse grained array in operation S1350.

According to an exemplary embodiment, the method of sharing the coarse grained array may transmit the determined instruction to the coarse grained array so that a portion of the third functional units is assigned to exclusively execute the first instruction set.

The above described methods including a method of sharing a coarse grained array may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reconfigurable processor comprising:
a first processor core including a plurality of first functional units which execute a portion of instructions of a first instruction set;
a second processor core including a plurality of second functional units which execute a portion of instructions of a second instruction set; and
a coarse grained array including a plurality of third functional units which execute another portion of instructions of the first instruction set and/or the second instruction set, instead of the first processor core and/or the second processor core,
wherein the plurality of third functional units executes the other portion of instructions of the first instruction set and/or the second instruction set in parallel with the plurality of first functional units and/or the plurality of second functional units executing the portion of instructions of the first instruction set and/or the second instruction set,
wherein an instruction of the first instruction set is capable of being executed by at least one third functional unit and at least one first functional unit, and
wherein an instruction of the second instruction set is capable of being executed by at least one third functional unit and at least one second functional unit.

2. The processor of claim 1, wherein the coarse grained array further comprises a first-in first-out memory, and the first-in first-out memory synchronizes data between the first processor core and the second processor core.

3. The processor of claim 2, wherein the first-in first-out memory delays data transmitted from the first processor core for a first delay time to transmit delayed data to the second processor core, and delays data transmitted from the second processor core for a second delay time to transmit delayed data to the first processor core.

4. The processor of claim 1, further comprising:
a configuration memory storing configuration information about connections between the plurality of third functional units of the coarse grained array.

5. The processor of claim 4, wherein the configuration memory stores the configuration information to execute the other portion of instructions of the first instruction set and/or the second instruction set in the coarse grained array.

6. The processor of claim 1, further comprising:
a functional unit controller assigning the other portion of instructions of the first instruction set and/or the second instruction set to the plurality of third functional units.

7. The processor of claim 6, wherein the functional unit controller determines assignment to the third functional units based on usage information of the first functional units and/or the second functional units.

8. The processor of claim 7, wherein the functional unit controller receives usage information of the plurality of first functional units from the first processor, and receives usage information of the plurality of second functional units from the second processor.

9. The processor of claim 6, further comprising:
a configuration memory storing configuration information about connections between the plurality of third functional units of the coarse grained array,
wherein the functional unit controller determines assignment to each of the plurality of third functional units by referring to the configuration information stored in the configuration memory.

10. The processor of claim 1, further comprising:
a temporary memory storing results of instructions executed by the coarse grained array.

11. The processor of claim 1, wherein a portion of the third functional units are assigned to exclusively execute the first instruction set.

12. The processor of claim 1, wherein the first processor core and the second processor core execute an instruction as a single cluster.

13. The processor of claim 12, wherein each of the first instruction set and the second instruction set is a portion of a single instruction set.

14. The processor of claim 1, wherein the first processor core and/or the second processor core is a very long instruction word (VLIW) processor core.

15. The processor of claim 1, wherein the first processor core comprises a first register file storing execution results of the plurality of first functional units, and the second processor core comprises a second register file storing execution results of the plurality of second functional units.

16. The processor of claim 15, wherein the first register file further stores a final execution result of the first instruction set to be executed in the coarse grained array, and the second register file further stores a final execution result of the second instruction set to be executed in the coarse grained array.

17. A method of sharing a coarse grained array including a plurality of third functional units, in a reconfigurable processor, comprising:
   generating a first determination signal by determining whether a portion of instructions of a first instruction set to be executed in a first processor core satisfies a determinant condition;
   generating a second determination signal by determining whether a portion of instructions of a second instruction set to be executed in a second processor core satisfies the determinant condition;
   transmitting another portion of instructions of the first instruction set and/or the second instruction set to the coarse grained array, based on the first determination signal and the second determination signal,
   wherein the plurality of third functional units executes the other portion of instructions of the first instruction set and/or the second instruction set in parallel with the plurality of first functional units and/or the plurality of second functional units executing the portion of instructions of the first instruction set and/or the second instruction set,
   wherein an instruction of the first instruction set is capable of being executed by at least one third functional unit and at least one first functional unit, and
   wherein an instruction of the second instruction set is capable of being executed by at least one third functional unit and at least one second functional unit.

18. The method of claim 17, further comprising:
   delaying result data of the first instruction set transmitted from the first processor core for a first delay time to transmit delayed data to the second processor core; and
   delaying result data of the second instruction set transmitted from the second processor core for a second delay time to transmit delayed data to the first processor core.

19. The method of claim 17, wherein the transmitting of the other portion of instructions to the coarse grained array comprises:
   determining an instruction of the first instruction set and/or the second instruction set to transmit the determined instruction to the coarse grained array by receiving configuration information of the coarse grained array from a configuration memory.

20. The method of claim 17, wherein the transmitting of the other portion of instructions to the coarse grained array comprises:
   receiving usage information of a plurality of first functional units in the first processor core;
   receiving usage information of a plurality of second functional units in the second processor core;
   determining an instruction of the first instruction set and/or the second instruction set to transmit a determined instruction to the coarse grained array based on the usage information of the plurality of first functional units and the usage information of the second functional units.

21. The method of claim 17, further comprising:
   temporarily storing results executed by the coarse array.

22. The method of claim 17, further comprising:
   exclusively executing the first instruction set in a portion of a plurality of third functional units in the coarse grained array.

23. The method of claim 17, further comprising:
   dividing a single instruction set to generate the first instruction set and the second instruction set.

24. A non-transitory computer-readable recording medium storing a program for implementing the method of claim 17.

25. A reconfigurable processor comprising:
   a first processor core including a plurality of first functional units which execute a portion of instructions of a first instruction set;
   a second processor core including a plurality of second functional units which execute a portion of instructions of a second instruction set;
   a coarse grained array including a plurality of third functional units which execute another portion of instructions of the first instruction set and/or the second instruction set, instead of the first processor core and/or the second processor core; and
   a functional unit controller which determines assignment of an instruction of the first and second instruction sets to the plurality of third functional units of the coarse grained array based on usage information of the first functional units and/or the second functional units,
   wherein the plurality of third functional units executes the other portion of instructions of the first instruction set and/or the second instruction set in parallel with the plurality of first functional units and/or the plurality of second functional units executing the portion of instructions of the first instruction set and/or the second instruction set.

* * * * *